United States Patent Office 3,113,028
Patented Dec. 3, 1963

3,113,028
TEA CONCENTRATE AND METHOD OF
MAKING SAME
Hugh S. Cooper, Shaker Heights, Earl T. Alvord, Euclid, and Andrew J. Lewis, Cleveland, Ohio, assignors to Rand Development Corporation, Cleveland, Ohio, a corporation of Ohio
No Drawing. Filed Feb. 24, 1961, Ser. No. 91,339
10 Claims. (Cl. 99—77)

The present invention is directed to a method of making a tea concentrate suitable for dilution to a delicious tea beverage, and to the tea concentrate itself, the concentrate being storable for a long period of time at relatively low temperatures without developing an objectionable turbidity.

It is an object of the present invention to provide a method of making a concentrated tea infusion that can be stored at a relatively low temperature for a long period of time without developing undesirable cloudiness from the formation of a turbid precipitate.

It is an object of the present invention to provide a concentrated tea infusion in which the ratio by weight of leaching water to tea is about 2/1 to 25/1, the concentrated tea infusion being storable at low temperatures without becoming cloudy and being adapted to make a delicious tea beverage by dilution with water or carbonated water.

It is an object of the present invention to provide a method of making a tea beverage by diluting a stable concentrated infusion of tea with water or carbonated water and bottling the diluted tea infusion to provide a delicious, yet storable beverage.

It is an object of the present invention to provide a concentrated tea infusion which can be stored for a long period of time without becoming cloudy.

Other objects will be apparent from the specification that follows and from the appended claims.

The present invention provides a method of preparing a concentrated infusion of tea that can be stored for a long period of time and can be mixed with a simple syrup solution either before or after storage. The resultant syrup-concentrate can be diluted and bottled to provide a delicious tea drink.

It has been found that, unexpectedly, the problem of preventing the development of an objectionable turbidity in tea upon standing is much different when treating a concentrated tea infusion than when treating a dilute solution of tea. In preparing a concentrated infusion of tea according to the present invention, the weight ratio of leaching water to tea is only about 2/1 to 25/1, or only about 1/12 to 1/2.5 the normal ratio of the weight of leaching water to tea as usually diluted for drinking. Apparently, the nature and behavior of the tea tannin material is different in concentrated than in dilute solutions and the tannin material cannot be easily and completely precipitated by merely treating the infusion with protein material and subsequently removing the precipitate formed as described in the copending application of Hugh S. Cooper, Serial No. 856,945 filed December 3, 1959, and assigned to the same assignee as the present application. Apparently, in order to provide a tea concentrate that will not become cloudy while in refrigerated storage, the amount and type of protein added is important since, for example, materials such as trypsin and pepsin will not work. Also, the method of adding the protein material is of importance; the protein material (preferably gelatin) must be heated and added in separate steps (at least six steps and preferably more) or else added very slowly with continuous vigorous agitation, followed by more agitation—either continuous or intermittent for a period of time after the addition has been completed. It has been found that either the slowly-added addition or the stepwise addition is necessary to provide coagulation of the protein material.

Furthermore, it has been found that the pH of the concentrated infusion of tea must be about 2 to 5 and preferably about 2.5 to 3.5 for the best results. When the pH is below 2, the taste of the aqueous solution is too acidic to be a good drink. When the pH is above 4.5 to 5, the bulk of the normal protein-tannate material will not precipitate out and remains in solution where it is easily oxidized or otherwise changed later to form a turbid precipitate when stored at a cold temperature or even at room temperature.

In a similar manner, the temperature of the concentrated infusion of tea at the time of the acid addition is critical, the only workable temperature range being about 45 to 60° F. The preferred range is about 48 to 58° F. and, for the best results, the temperature should be 50 to 55° F. Apparently, when the temperature is lower than 44 or 45° F., not all the turbidity producing protein-tannate materials are removed and such infusion becomes cloudy upon storage of a day or so. Likewise when the temperature is much greater than 59° or 60° F., some of the protein-tannate precipitate eventually precipitated evidently includes some material that helps supply the tea with its aroma and flavor and the resultant concentrate is not as palatable as it should be; in addition, some haze develops in the concentrate upon storage at a much lower temperature, say about 32 to 40° F.

As previously indicated, the temperature of the acid addition and the subsequent gelatin addition is important, the best treatment being (1) cooling the infusion to 50 to 55° F., acidifying and adding a portion of the gelatin and (2) cooling the infusion to 32 to 33° F. and adding the balance of the gelatin material. As in the acidifying step, the gelatin-precipitating steps may be performed, in some applications, when the infusion is at a slightly different temperature—namely, about 31 to 35° F.

As previously indicated, the amount of water-soluble protein material that is used to precipitate and thus eliminate the turbidity from the infusion of tea is important and must be in the range of about ⅛ to 4 parts by weight based on 100 parts by weight of the tea and 200 to 2500 parts by weight of hot leaching water. In general, although the amount of soluble protein material used is small, it is found that when more than approximately 4 parts by weight, say 5½ to 6 parts by weight, of protein material is added; the resultant precipitate is complex in nature and cannot be easily eliminated. This type of precipitate, while not completely understood, is apparently different from the precipitate formed when less than four parts by weight of soluble protein matter is added. On the other hand, when less than ⅛ part by weight of the protein material is added, not enough precipitate is formed and the resultant solution becomes turbid upon cold storage.

As also previously indicated, the above range of ⅛ to 4 parts by weight of the soluble protein material (of which gelatin is by far the best) covers the total amount of gelatin added and the gelatin should be added in at least about 6 steps or else adder very slowly during continuous agitation of the acidified infusion. The total amount should be added very slowly or preferably in about 6 to 20 steps using as low as about 0.015 to 0.06 or up to as high as about 0.225 or even 0.9 part by weight of the protein material each step. It has been found that by using more or less than the above described amount, many problems are created and the resultant solution either does not have the proper flavor and aroma or is not completely free of turbidity upon cold storage.

In precipitating the tea tannin material, a temperature of the infusion of about 32 to 33° F. is preferred, but a two-step procedure is preferred where the solution is cooled to a preferred range of 48 to 58° F. during the first step. Of the various protein materials suitable for use at temperature of 32–33° F., a dilute aqueous gelatin solution preferably is used, it having been found that hot liquid gelatin is necessary and that solid gelatin does not work.

In general, the best hot dilute gelatin solutions contain about 0.7 to 1.0 percent by weight of gelatin although solutions containing as low as 0.2 and as high as 1.5 percent also provide excellent results. In general, for satisfactory results, the amount of gelatin may vary from about 0.125 to 4 percent by weight. The temperature of the dilute gelatin solution may be generally about 100° F. to 160° F., although a range of about 120 to 140° F. is greatly preferred.

Thus, in the present invention, the once-cooled acidified infusion is further cooled to 31–35° F., and the above described hot dilute gelatin solution (having a temperature, for best results, of 120–130° F.) is added to the precipitate out the haze-producing materials.

In general, when the hot gelatin or other liquid protein material is added in nine steps; 15 to 30 parts by weight of the above described dilute aqueous gelatin solution preferably is added each step—the above gelatin solution containing about 0.2 to 1.5 percent by weight of gelatin. Thus, in accordance with a preferred embodiment of the present invention, a total of only about 135 to 200 parts by weight of an aqueous gelatin solution (containing 0.2 to 1.5 percent gelatin) need be added to the tea infusion made from 100 parts tea beverage and about 300 to 400 parts by weight of leaching water. While generally good results are obtained when the gelatin is added in nine steps, under some conditions, only six steps need be employed. However, preferably 9 or 10 additions are required to provide the best all around tea beverage from the standpoint of flavor, aroma, appearance and lack of cloudiness, although as many as 19 to 20 steps may be employed if desired.

It has also been found that each addition of gelatin solution (when stepwise additions are made) should be made as low as about ½ up to as high as 15 minutes apart to allow enough time to mix properly the gelatin and the concentrated tea infusion and to provide time for the resultant flocculation, precipitation and settling of the protein-tannate material to the bottom. After the first gelatin addition, the next portion of dilute gelatin solution is added preferably without first filtering the previous mixture which comprises a clear supernatant liquid and a precipitate at the bottom. Preferably, the entire mixture of precipitate and infusion is again stirred with the next gelatin addition and the insoluble material again allowed to settle. These steps are repeated and, finally, in the last step; the protein-tannate precipitate is removed by filtering, centrifuging or by other suitable means as is well known in the art. The resultant concentrated infusion of tea is stable for long periods of time at cold storage which may be at a temperature around 32 to 40° F. or slightly warmer.

While the best procedure, from the standpoint of economy and final tea product comprises letting the precipitate settle during each of the above described steps; the precipitate may be filtered or otherwise separated from the clear supernatant liquid during each step.

Also, again describing the addition of gelatin; the whole amount may be added at once. Again, the gelatin must be in the form of a hot dilute solution as described, and continuous mixing thereof must accompany the gelatin addition. For instance, when adding 120 grams of a 0.8% gelatin solution to 400 grams of concentrated infusion, a total continuous addition time of about 5 to 15 minutes is preferred with constant stirring. Thus, a total of 8 to 10 minutes (when 120 parts hot dilute gelatin is added to 400 parts infusion) provide excellent results and amounts to a rapid dropwise addition of the material.

In the present invention, the outstanding protein material has been found to be gelatin. Other water soluble protein materials including papain, albumin and casein may be used in place of the gelatin. However, if used, the papain, or other protein material that has been made water soluble by enzyme action or by acid or basic hydrolysis, is added preferably as only a minor portion and, better, only as ¼ or less of the total weight of protein material.

The best gelatin for an economical process and a final clear, sparkling tea beverage is commercial gelatin which, for instance, may comprise 49.38% carbon, 6.81% hydrogen, 17.9% nitrogen, 0.71% sulfur and 25.13 oxygen. Also, ligament gelatin and tendon gelatin may be used, and with certain types of tea leaves, these gelatins may be just as satisfactory as commercial gelatin. Other suitable gelatins may be bone gelatin or vegetable gelatin.

The gelatin, which is an amphoteric albumin material, may have one of the following proposed formuae:

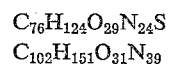

$$C_{76}H_{124}O_{29}N_{24}S$$
$$C_{102}H_{151}O_{31}N_{39}$$

In general, Vinter's gelatin provides excellent results. Further describing suitable gelatin material for use in the present invention, the gelatin may have a molecular weight of about 10,000 to 100,000 or more, although for the best beverages from the standpoint of flavor and sparkling clearness, a molecular weight of about 1800 to 2500 is preferred.

Gelatin may, as is well known in the art, be prepared from different sources and may be the complex protein material obtained from collagen by boiling animal tissues with water, straining the liquid, and evaporating to dryness. Commercially, gelatin may be prepared from animal bones by boiling them in water acidified with hydrochloric acid. In any event, gelatins, prepared from different sources, differ slightly in molecular structure and composition, but generally contain about 48 to 52 percent carbon, 5 to 8 percent hydrogen, 24 to 26 percent oxygen and 16 to 19 percent nitrogen. Further, the molecular weight of highly purified gelatin material, determined by osmotic methods, may be as high as 30,000 to 40,000. While not completely determined, collagen (from which gelatin is obtained by boiling—and is therefore similar in basic structure) is believed by some to consist of a molecule of glycine joined by a peptide linkage to a different amino acid which itself is attached to a molecule of proline. The above described chain of three amino acids, is then repeated many times in the collagen molecule.

Returning to the novel method of the present invention, two cooling steps are generally necessary prior to the addition of the hot gelatin solution in order to obtain a stable haze-free tea drink. It is highly preferred that about 50 to 90% of the gelatin solution be added in the first cooling step, i.e., the step in which the temperature of the infusion is preferably about 50 to 54° F. Likewise, at least 10 and up to 20% of the gelatin solution is generally added in the final cooling step in which temperatures of the infusion is about 31 to 35° F. Thus, in one of the preferred embodiments of the present invention, about 75 to 95% of the gelatin solution is added to the infusion at about 52 to 56°F. and then the balance of the gelatin solution (about 5 to 25%) added to about 32 to 33° F.

Filtration of the gelatin precipitate before the final cooling step is optional. However, either filtration or centrifugation is necessary to obtain final separation of the precipitate from the infusion.

In accordance with the present invention, if the gelatin solution is added in one large amount during the first cooling step, the total amount of agitation given to the infusion must be at least as much as if gelatin was added in six steps in accordance with the procedure previously described in detail. Apparently, adding all the gelatin in one step is feasible if the infusion is rapidly stirred continuously or intermittently so that the gelatin or other protein has a good period of contact with the insolubles in the acidified tea infusion.

When equal volumes of concentrated acidified tea infusion are placed in glass containers and to each is added in one step enough gelatin solution (namely ⅛ to 4 parts by weight of gelatin per 100 parts by weight of tea) to precipitate all the tannins and other insoluble materials and the resultant infusion briefly stirred; only about ⅕ of the turbid insolubles precipitate. However, when one of the two volumes of infusion is stirred continuously for one hour and the other infusion stirred intermittently and the total stirring time is similar to the stirring time in the step-by-step addition of the gelatin solution previously described, both volumes yield a product which is at least about 75% as clear as those previously described in which the gelatin is added six steps. Thus, in accordance with the present invention, the amount of precipitate is greatly increased upon incremental or continuous stirring of the infusion even though no more gelatin is added after its addition in the proper amount during the first cooling step. However, as previously indicated, it is also apparent that by far the best product is made when the gelatin is added in at least 6 equal steps, since generally only 75 to 95% of the protein tannate material is effectively removed when the gelatin is added in one step and the infusion further processed by incremental or continuous stirring.

In any event, the best dilute protein solution has been found to be an aqueous one containing about 0.2 to 5% by weight of the gelatin; in addition, the solution preferably also should contain about ½% by weight of 5 to 10% essence of lemon—although the weight percentage of essence of lemon may vary from as low as about ⅛% by weight up to as high as 100% or pure essence—namely, the pale essential oil expressed from fresh lemon peels and having a density of about 0.84 to 0.86. In accordance with the above, the weight range of the pure lemon essence may vary from about ¹⁄₂₀% to as high as 1½% of the weight of the tea.

As previously indicated, the addition of an acidifying agent before the protein addition is a preferred step in the process of the present invention. The best acidifying agent is citric acid such as that made by fermenting molasses. Citric acid is a non-poisonous water soluble normally solid acid material that is well suited to reduce the pH of the concentrated tea infusion to its required level. Other acidic materials that may be used are lactic acid and acetic acid. The above acidifying agent may generally be present in amounts of ½ to 12 parts by weight per 100 parts by weight of tea.

In addition to the above amounts of an acidifying agent per 100 parts by weight of tea, a reducing agent preferably also is used in amounts of about ¼ to 1½ parts by weight. By far the best reducing agent is ascorbic acid, which apparently helps to prevent the oxidization of certain of the protein-tannate complexes to form insoluble turbid precipitates upon standing in cold storage. Ascorbic acid is also a vitamin material and is valuable for use as a vitamin supplement in the tea drink as well as preventing the further precipitation of the turbid, muddy precipitate, however, in some instances, reducing agents such as sodium bisulphite may also be used as all or part of the reducing agent.

Other materials that may be added advantageously to the tea concentrate are food perservatives, preferably sodium benzoate, to prevent formation of bacteria and mold. When used, sodium benzoate is used in an amount of about 0.02 to 0.04 part by weight per 100 parts of tea.

In order to provide a delicious end product from the above described concentrated infusion in an industrial operation, the concentrate may be stored in large tanks and mixed with a simple sweet syrup solution using the syrup in an amount of about ½ to 2 times by weight of the concentrated infusion. The resultant syrup-concentrate then may be diluted with water or carbonated water to form a delicious beverage. Generally, carbonated water or water is added to the syrup-tea concentrate mixture in an amount of 3 to 7 times the weight thereof to form an excellent tea drink. The resultant diluted tea drink may be bottled, canned or otherwise stored for a long period of time without forming a muddy or hazy appearance.

The following examples are used to illustrate the invention and not to limit it in any way:

Example 1

Approximately one third of a gallon of a concentrated infusion of tea was made by leaching 300 grams of tea in the form of Lipton "Orange Pekoe" tea bags in 2100 ml. of hot water at a temperature of 200° F. for 6 minutes in a large vessel. The tea bags were separated from the infusion of tea to provide a final volume of 1200 ml. and the 1200 ml. of infusion cooled to 50° F. using an ice bath. An aqueous solution of 16 grams citric acid, 4 grams of ascorbic acid and 0.2 gram sodium benzoate in 50 ml. of water was mixed into the tea infusion and the mixture stirred for good dispersion. The mixture was allowed to settle for 20 minutes at which time a precipitate formed and settled slowly to the bottom of the vessel. The pH was found to be 2.7.

Still at a temperature of 50° F., 10 ml. of a dilute gelatin solution was added to the above described concentrated tea infusion. The dilute gelatin solution was an aqueous solution containing 0.84% by weight gelatin and ½% by weight of a 5% essence of lemon. After the addition of the 20 ml. of essence-gelatin solution, the resultant precipitate was given 10 minutes to flocculate and settle to the bottom of the vessel. Thereafter 10 ml. of the same essence-gelatin solution was again added and, once again, 10 minutes was allowed for the precipitate to settle to the bottom of the vessel. After nine of the above gelatin addition steps, finally the solution was chilled to 32° F. and 20 ml. of the gelatin solution was mixed with the infusion and the infusion allowed to stand for 30 minutes while the precipitate settled to the bottom. The infusion was chilled to 32° F. and the supernatant clear liquid upper layer was filtered off to separate it thereby from the precipitate which was the bottom layer. The supernatant liquid was filtered using 4 sheets of Whatman No. 3 filter paper to provide a clear stable tea concentrate infusion, the clear concentrate comprising about ⁹⁄₁₀ of the total volume of the material before separation from the precipitate.

While not needed, a second filtration was performed and the resultant tea concentrate appeared to be even more sparkling and desirable in appearance than it was before the second filtration.

The resultant tea concentrate was mixed with a simple syrup solution in the volume ratio of one part of syrup solution to one part tea concentrate. This mixture was then diluted 4 times its volume with water and the resultant mixture bottled.

After the above bottled beverage was stored on a shelf for 3 months, the beverage was cooled to a temperature of 40° F. The bottle was opened and the tea beverage was found to be delicious in taste—the beverage having retained its flavor and aroma. The beverage remained clear in appearance and free from objectionable turbidity.

Example 2

A clear stable concentrated infusion of tea was made as described in Example 1 except that each addition of the essence-gelatin solution was made at 52° F. instead of 50° F.; 12 grams of citric acid was added to the infusion instead of 16 grams as in Example 1; and the pH of the concentrated infusion before addition of the essence gelatin solution was 2.5 instead of 2.7. The resultant tea concentrate was diluted with 4½ times its weight of carbonated water to provide a delicious tea beverage that was storable for a long period of time at 36° F. without becoming turbid or muddy in appearance.

Example 3

A concentrated infusion of tea was made by stirring 300 grams of Lipton Orange Pekoe Tea into 2100 ml. of boiling, deionized water. The tea was permitted exactly 6 minutes to leach. After leaching, the tea leaves were separated from the solution to yield a final volume of 1200 ml. of concentrated tea infusion which amounted to about 57% of the original weight of the water.

The above described concentrated infusion was cooled to 53.6° F., whereupon 10 gm. of hydrous citric acid and 100 mg. of sodium benzoate was added with stirring until the citric acid and sodium benzoate dissolved.

Then, 90 ml. of an aqueous essence of lemon-gelatin solution containing .5% by weight of essence of lemon and 0.8% Vinter's gelatin were added drop by drop to the infusion with constant stirring, the drop-wise addition lasting a period of 20 minutes. The resulting precipitate was filtered. The filtrate, which was the filtered tea infusion, was cooled to 32.5° F. and an additional 20 ml. of the above described essence-gelatin solution was added to the infusion in a drop by drop manner with continuous stirring.

The resultant solution was filtered using two sheets of Whatman #3 and one sheet of Whatman #1 filter paper to separate precipitate from the solution. To the resultant clear tea concentrate solution, 2 gm. of the ascorbic acid was added as an antioxidant. The concentrate was then diluted by water at the ratio of 8 parts by water to one part tea concentrate. One part 27° Bé. syrup solution was also mixed in the solution with the above 8 parts of water.

The resultant diluted tea drink was delicious and did not become cloudy upon storage at 40° F.

In the above described Example 3, the 90 ml. of essence-gelatin solution used in the first cooling step (53.6° F.) can be added in increments if desired. Also the essence-gelatin solution can be added in one amount and mixed with the tea infusion with incremental stirring to provide the same haze-free, delicious tea drink.

Likewise, the 20 ml. of essence-gelatin solution added at 32.5° F. in the Example 3, can also be added in steps with continuous or incremental stirring. Also, the 20 ml. can be added at once and the treated infusion intermittently stirred. In any event, a delicious tea product is obtained although incremental additions of the gelatin produce the best product.

In the above described examples, other gelatins such as ligament and tendon gelatins may be substituted in whole or part for the Vinter's gelatin used, the Vinter's gelatin being a commercial gelatin. Likewise, other protein materials previously described as suitable, such as papain, albumin and casein can be substituted for all or preferably a minor portion of the gelatin used in the example to provide similar results, even though commercial cooking gelatin provides the best tea beverage from the standpoint of good flavor and lack of objectionable turbidity.

Other reducing agents such as sodium bisulfite may be used in place of the ascorbic acid, although, again, ascorbic acid is by far the best antioxidant and reducing agent.

In a similar manner, essence of lime (such as a 1 to 10% essence—or even pure essence although a 5% essence is preferred—or other citric fruit essential oil) can be substituted for the 5% or pure essence of lemon juice used in the examples to provide similar results. Other sweetening agents such as sodium cyclamate, and sodium saccharin and calcium saccharin may be used although they are not as effective in the low pH solutions as are concentrated cane or beet sugar solutions. Other food preservatives, such as potassium benzoate can be used in place of the sodium benzoate used in the above examples. Likewise, other types of tea can be used as all or part of the Lipton's Orange Pekoe tea in the above example to provide similar results. Thus, Indian, Formosa, Chinese and Japanese black tea and mixtures thereof also provide an acceptable end product.

The tea concentrate, made according to the present invention, such as the liquid concentrate produced in Examples 1, 2 and 3, can be frozen and stored in its frozen solid state for long periods of time at temperatures, say, of about −30 to 20° F. This frozen condition is further assurance against any sedimentation. The frozen concentrate then can be thawed and diluted with water as before described to provide a delicious drink. The concentrate is particularly well suited for freezing and storage in cans like frozen orange juice. The frozen concentrate, when thawed and diluted, is free from objectionable turbidity.

Powdered tea concentrate can be made from the liquid concentrate (such as produced in Examples 1, 2 and 3) by evaporating the concentrate, sweetened or unsweetened, in an inert atmosphere such as carbon dioxide under a low pressure, say, of about 5 to 10 millimeters up to about 50 or 60 millimeters of mercury. Apparently the low pressure does not remove the essential oils from the concentrate, and the resultant crush readily crumbles to a powdered form. The resultant powder can be used like instant coffee or can be pelletized or made into tablets if desired.

In any event, the powder may be mixed with cool water (about one teaspoon of powder per 8 oz. of water) to provide a delicious tea drink. Further, the chilled drink thus produced does not develop turbidity even during storage at cool temperatures.

It will be understood that the above description is by way of illustration rather than by way of limitation and that, in accordance with the provisions of the patent laws, variations and modifications of the specific product and process disclosed herein may be made without departing from the spirit of the invention.

What is claimed is:

1. A method of preparing a stable tea concentrate comprising the steps of leaching about 100 parts by weight of tea with about 200 to 2500 parts by weight of hot water, separating the tea from the resulting solution to provide about 150 to 1500 parts by weight of a concentrated infusion tea, cooling said infusion to a temperature of about 45 to 60° F., acidifying said infusion to a pH of about 2 to 5, adding thereto and mixing therewith an aqueous solution containing about 0.2 to 1.5 percent by weight of gelatin and having a temperature of about 100° F. to 160° F. to form a precipitate, cooling said infusion to a temperature of about 31 to 35° F. and adding said liquid solution so that the total amount thereof added is about ⅛ to 4 parts by weight, and separating the precipitate from the infusion to provide a relatively clear stable liquid tea infusion.

2. A method of preparing a stable tea concentrate that will remain clear for a long period of time, said method comprising the steps of leaching about 100 parts by weight of tea with 200 to 2500 parts by weight of hot water to provide a concentrated infusion of tea, cooling said infusion of tea to a temperature of about 45° F. to 60° F., acidifying said infusion at 45 to 60° F. to a pH of about 2 to 5, adding to and mixing with the infusion about ⅛ to 4 parts by weight of a soluble protein material comprising an aqueous solution of gelatin in at least about six steps using about .015 to 0.9 part by weight of the material at each step to form thereby a precipitate, cooling the temperature of the infusion to about 31 to 35° F. before at least the last of said six steps in which protein material is added, separating said precipitate from the infusion to provide a relatively clear stable liquid tea infusion.

3. A method of preparing a stable tea concentrate that will remain clear for a long period of time, said method comprising the steps of mixing about 100 parts by weight of tea leaves and about 200 to 2500 parts by weight of water, leaching said tea leaves at a temperature of about 190 to 210° F. for about 3 to 10 minutes to form a mixture of said tea leaves and an infusion of tea containing soluble tea tannin material, acidifying said infusion to a pH of about 2 to 5, treating said infusion at a temperature of about 45 to 60° F. with about 15 to 30 parts by weight of an aqueous gelatin solution comprising about 0.125 to 4 percent by weight of gelatin to thereby precipitate protein tannate material, repeating said treatment of the infusion at said temperature with said 15 to 30 parts by weight of said aqueous gelatin solution at least about five times, cooling the temperature of the infusion to about 31 to 35° F. before at least the last of said six steps in which protein material is added, and thereafter separating the precipitated protein-tannate material from the infusion to provide a relatively concentrated liquid tea infusion that can be stored for a long period of time without becoming cloudy.

4. A method of preparing a stable liquid tea concentrate that will remain clear for a long period of time comprising the steps of mixing about 100 parts by weight of tea leaves with about 200 to 2500 parts by weight of water, steeping said leaves in the water at a temperature of about 190 to 210° F. for about 3 to 10 minutes to form a mixture of said leaves and in infusion of tea comprising water containing dissolved tea tannin material, filtering said mixture to remove the leaves and provide a tea concentrate, cooling said tea concentrate to about 45 to 60° F. adding about ½ to 5 parts by weight of a water soluble nonpoisonous acidifying agent and about ⅛ to 1 part by weight of a reducing agent to said concentrate to provide said concentrate with a pH of about 2 to 5, adding to said concentrate at a temperature about 45 to 60° F., about 15 to 30 parts by weight of an aqueous gelatin solution comprising about 0.2 to 1.5 percent by weight of gelatin, mixing said gelatin solution and said concentrate to form a precipitate and clarifying the resultant mixture by allowing the precipitate to settle and provide a relatively clear supernatant liquid above the settled precipitate, repeating at least about eight times the steps of adding to and mixing with said supernatant liquid about 15 to 30 parts by weight of the gelatin solution at the temperature of about 45 to 60° F. and clarifying the resultant mixture, adding to said concentrate at 45 to 60° F. about 15 to 30 parts by weight of an aqueous solution of a mixture of water soluble protein materials comprising gelatin and casein and clarifying the resultant mixture, cooling the temperature of the infusion to about 31 to 35° F. before at least the last of said eight steps in which protein material is added, separating the precipitate from the clear supernatant liquid to provide a clear tea concentrate that is stable at a temperature as low as about 32° F. for a long period of time, mixing said concentrate with about ½ to 1½ times the weight thereof with a simple sweet syrup mixture to form a stable syrup-tea concentrate mixture, and thereafter mixing said syrup-tea concentrate mixture with about three to seven times the weight thereof of water to provide an excellent tea drink.

5. A method of preparing a stable tea concentrate in which the weight ratio of leaching water to tea is about 3.5/1 to 4.5/1, said method comprising the steps of leaching about 100 parts by weight of tea with about 350 to 450 parts by weight of water at a temperature of about 198° F. to 202° F. for about 5½ to 6½ minutes to form a mixture of said leaves and an infusion of said tea containing soluble tea tannin material therein, acidifying the infusion with citric acid to provide the infusion with a pH of about 2 to 5, treating said infusion at a temperature of about 50° F. to 54°F. with about 21 to 23 parts by weight of an aqueous gelatin solution having a temperature of about 100 to 160°F. and containing about 0.6 to 0.8 percent by weight of gelatin to form a precipitate, repeating said treatment of the infusion at said temperature with 21 to 23 parts by weight of said gelatin solution at least about five times, cooling the temperature of the infusion to about 31 to 35° F. before at least the last of said six steps in which protein material is added, and thereafter separating the precipitate from the clarified infusion to provide a relatively clear concentration tea infusion that can be stored for a long period of time without becoming cloudy.

6. A method of preparing a stable tea concentrate comprising the steps of leaching about 100 parts by weight of tea with about 200 to 2500 parts by weight of hot water, separating the tea from the resulting solution to provide about 100 to 1500 parts by weight of concentrated infusion of tea, cooling said infusion to a temperature of about 45 to 60° F. and a pH of about 2 to 5 and adding thereto with continuous stirring a liquid solution of a water soluble protein material comprising gelatin to form a precipitate, said addition of precipitate being continuous in a drop by drop fashion, cooling said infusion to a temperature of about 31 to 35° F. and adding to said solution drop-wise with continuous stirring the said water soluble protein material so that the total amount thereof added is about 4 parts by weight and about 5 to 25% by weight of the protein material is added in the latter step where the temperature of the tea infusion is about 31 to 35° F., and thereafter separating the precipitate from the infusion to provide a relatively clear stable liquid tea concentrate.

7. A method of preparing a stable tea concentrate solution comprising the steps of leaching about 100 parts by weight of tea with about 200 to 2500 parts by weight of hot water, separating the tea from the solution to provide about 150 to 1500 parts by weight of a concentrated infusion of tea, acidifying said infusion to a pH of about 2 to 5, cooling said infusion to a temperature of about 31 to 35° F., adding to said infusion at said temperature of about 31 to 35° F. about ⅛ to 4 parts by weight of a water soluble protein material comprising gelatin to form a precipitate, and separating the precipitate from the infusion to provide a relatively clear stable liquid tea infusion.

8. A method as defined in claim 7 in which the pH of the acidified infusion is about 2.5 to 3.5 and the gelatin that is added is a hot aqueous solution of gelatin having a temperature of about 100 to 160° F.

9. A method as defined in claim 7 including the step of freezing the resultant clear liquid tea infusion.

10. A method as defined in claim 7 including the step of evaporating the clear concentrated tea infusion to produce a solid powdered concentrate material that can be mixed with water to provide a delicious tea drink.

References Cited in the file of this patent

UNITED STATES PATENTS

| | | |
|---|---|---|
| 1,094,675 | Moncreef | Apr. 28, 1914 |
| 1,854,062 | Potter et al. | Apr. 12, 1932 |
| 2,831,772 | Herz | Apr. 22, 1958 |
| 2,875,062 | Werner | Feb. 24, 1959 |
| 2,891,865 | Seltzer et al. | June 23, 1959 |
| 2,963,368 | Greenbaum | Dec. 6, 1960 |
| 2,978,328 | Melzard et al. | Apr. 4, 1961 |